United States Patent Office 3,669,660 Patented June 13, 1972

1 2

3,669,660

LITHOGRAPHIC PLATE DEVELOPING COMPOSITION AND PROCESS OF USE THEREOF

Eugene Golda, Monsey, and Alfred Taudien, New York, N.Y., assignors to Polychrome Corporation, Yonkers, N.Y.

No Drawing. Filed May 21, 1970, Ser. No. 39,572
Int. Cl. G03f 7/02
U.S. Cl. 96—33 6 Claims

ABSTRACT OF THE DISCLOSURE

Developing compositions for negative-acting lithographic plates sensitized with substantially water-insoluble diazonium compounds comprising aqueous solutions of water-soluble sulfonic acids or water-soluble salts of sulfonic acids.

This invention relates to a developing system for lithographic printing plates, and more particularly to compositions for developing an exposed lithographic plate to remove non-image areas and to prepare the plate for press.

Lithographic printing utilizes the immiscibility between oleophilic inks and an aqueous dampening fluid on a substantially planar printing plate surface. An oleophilic image area that corresponds to an image to be printed is fromed on a plate while the remainder of the plate surface, the non-image area, is or is made hydrophilic in character. The image area accepts greasy ink and transfers the ink during printing; the non-image area is kept damp with water or an aqueous dampening fluid and repels the ink so that no printing occurs from that area. To form such a printing plate, a flat base surface is coated with a very thin layer of a light-sensitive material and exposed to light through a transparent film having opaque areas. A negative transparency of the image desired to be reproduced is used for exposing a so-called negative-acting plate. Light passes through the clear areas of the transparency, which correspond to the image, and causes a reaction in the light-sensitive coating on the underlying plate that "hardens" the coating in the image area. Light does not pass through the opaque areas of the transparency, however, so that the light-sensitive coating on the plate underlying such areas remains uneffected. The plate is then developed by removing the coating from the plate in unexposed areas which are hydrophilic, or are then made hydrophilic.

It is an object of this invention to provide an improved developing system for lithographic printing plates. A more particular object of this invention is to provide an improved developer composition for removing unexposed non-image areas from lithographic printing plates on which the light-sensitive agent in the coating thereon is a substantially water-insoluble diazonium compound.

Broadly the invention involves aqueous developing compositions containing a water-soluble sulfonic acid or a water-soluble sulfonic acid salt that readily solubilizes and removes from exposed lithographic plates the unexposed, still light-sensitive, coating in which the light-sensitive component is a diazonium compound, particularly a substantially water-insoluble diazonium compound.

One of the important types of known negative-acting diazo components utilized in lithographic plates are reaction products of a light-sensitive diazo-containing compound and a coupling agent, which reaction products retain their light-sensitivity. The reaction products, however, generally have less water-solubility than either of their components, and generally tend to be substantially insoluble in water. Thus, while such reaction products can conveniently be coated onto bases from solvent and even from dilute aqueous solutions to make plates, their development by aqueous developers is difficult because of the relative insolubility in water or the lack of sufficient selective solubility between exposed and unexposed areas—so-called differential—in solvents.

The light-sensitive diazo-containing components of the reaction products are the negative-acting diazonium compounds known and commonly used in the lithographic art. Broadly they are diazo-aromatics, and more particularly diazo-arylamines, that can be substituted on the aromatic nucleus or on the amino-nitrogen. The most commonly used of such diazo compounds is para-diazodiphenylamine and derivatives thereof, especially reacted with organic condensing agents containing reactive carbonyl groups, such as aldehydes and acetals, particularly with compounds such as formaldehyde zinc chloride and paraformaldehyde. The preparation of some such eminently suitable condensation products is disclosed in U.S. Pats. No. 2,922,715 and 2,946,683.

To form the light-sensitive substantially water-insoluble diazonium coating components, the diazo-aromatic compounds mentioned above preferably are coupled with an aromatic or aliphatic compound having one or more phenolic hydroxyl groups or sulfonic acid groups —$SO_3$, or both. Examples of coupling agents having phenolic hydroxyl groups are hydroxy benzophenones, diphenolic acids such as 4,4-bis(4'-hydroxyphenyl)pentanoic acid, resorcinol and diresorcinol, which can be further substituted. Hydroxybenzophenones include 2,4-dihydroxy-, 2-hydroxy-4-methoxy-, 2,2'-dihydroxy-4,4'-dimethoxy- and 2,2',4,4'-tetrahydroxy-benzophenone. Preferred sulfonic acids are those of the aromatic series, particularly of benzene, toluene, xylene, naphthalene, phenol, naphthol and benzophenone, and the soluble salts thereof such as the ammonium and the alkali metal salts. The sulfonic acid group-containing compounds generally can be substituted by lower alkyl, nitro and halo groups as well as additional sulfonic acid groups. Examples of such compounds include benzene sulfonic acid, toluene sulfonic acid, naphthalene sulfonic acid, 2,5-dimethyl-benzene sulfonic acid, benzene sodium sulfonate, naphthalene-2-sulfonic acid, 1-naphthol-2-(or 4-)-sulfonic acid, 2,4-dinitro-1-naphthol-7-sulfonic acid, 2-hydroxy-4-methoxy-benzophenone-5-sulfonic acid, m-(p'-anilino-phenylazo)-benzene sodium sulfonate, alizarin sodium sulfonate, o-toluidine-m-sulfonic acid and ethane sulfonic acid.

The diazo compound and the coupling agent are reacted together, preferably in aqueous solution at a pH of below about 7.5, in approximately equimolar quantities. The reaction product is usually isolated as a precipitate, and can be coated by common techniques onto appropriate lithographic base sheets to form sensitized plates, as described, for example, in U.S. Pat. No. 3,300,309.

To develop the negative-acting lithographic plates described above, we have found an aqueous delevoping system eminently suitable for removing the relatively water-insoluble unexposed non-image areas that comprises, as the active agent, an aromatic or aliphatic compound having a sulfonic acid group —$SO_3^-$. Such compounds in general are the same as the ones previously described as being suitable for making, with the diazo compound, the light-sensitive reaction product that is in the sensitized coating on the plate. Examples of such compounds include benzene sulfonic acid, toluene sulfonic acid, naphthalene sulfonic acid, 2,5-dimethyl-benzene sulfonic acid, benzene sodium sulfonate, naphthalene-2-sulfonic acid, 1-naphthol-2-(or -4-)-sulfonic acid, 2,4-dinitro-1-naphthol - 7-sulfonic acid, 2-hydroxy-4-methoxy-benzophenone-5-sulfonic acid, m-(p'-anilino-phenylazo)-benzene sodium sulfonate, alizarin sodium sulfonate, o-toluidine-m-sulfonic acid and ethane sulfonic acid. The sulfonic acid group containing compounds are dissolved in water to form developer solutions. Although the mechanism of the developer's effect on the plate is not fully understood, it presently appears that the sulfonic acid group of the developer reacts with the diazo group to form a hydrazine group, thereby desensitizing the diazo component in the coating and substantially increasing its water-solubility.

There appears to be no limitation on the amount of sulfonic acid group containing compounds in the developer solutions other than practical considerations. For example, economics and the solubility of the compound in water governs a practical upper limit of concentration, whereas time of development principally governs the lower limit. For example, at concentrations of about 1%, the development time is in the order of about five or more minutes, which from a busy lithographer's standpoint is inordinately long compared to the roughly one-half to about two minutes that he finds desirable. That desired range of time can be obtained with the instant developing systems at solution concentrations of from about 5% to about 25% by weight of sulfonic acid compound in solution. The preferred range of concentration is about 10% to about 20%, which gives good development time, in the order of about one minute, and also provides sufficient water for dissolution and removal of the unexposed coating without the need for excessive rinsing.

We have found it desirable also to include in the developer solutions additional ingredients to facilitate development and to provide plate treatment. For example, up to about 20% by weight of a solvent miscible with the water is helpful to assist removal of the desensitized diazonium compound. Preferably, there are used about 5% of solvents such as cyclohexanone, dimethylformamide, dimethylsulfoxide, isopropanol, dioxane and methyl Cellosolve. Surfactants to promote contact between the aqueous developer and the light-sensitive coating can be used in amounts up to about 5% by weight. Such agents include ammonium and alkali metal salts of long-chain alcohol sulfates, for example, sodium lauryl sulfate, sodium octyl sulfate, ammonium lauryl sulfate, sodium N-methyl-oleyl taurate, dioctyl sodium sulfosuccinate, glycerol monostearate, sodium dodecylbenzene sulfate and polyoxyethylene glycol monostearate. Up to about 5% by weight of phosphoric acid or oxalic acid can also be used as agents to clean the aluminum base sheet after the desensitized coating is removed. Other similar agents known in the art can, in general, also be used as might be desired.

The following examples are set forth to illustrate specific embodiments of the invention as described above.

EXAMPLE 1

A developer composition was formulated with 20 parts (by weight) of sodium toluene sulfonate, 5 parts of polyethylene glycol 200, 10 parts of propylene glycol, 1 part of Triton CF-10 wetting agent (Rohm & Haas) and 64 parts of water. The developer was used to develop a lithographic plate sensitized with the coupled reaction product of para-diazo-diphenylamine-formaldehyde zinc chloride and 2-hydroxy-4-methoxy-benzophenone that had been exposed through a negative image transparency. The plate was fully developed in less than about 2 minutes, and had a strong printing image and a clean background non-image.

EXAMPLE 2

A developer composition was formulated with:

| | Parts |
|---|---|
| Sodium xylene sulfonate | 20 |
| Hexylene glycol | 5 |
| Methyl ethyl ketone | 5 |
| Phosphoric acid | 0.5 |
| Water | 69.5 |

The developer effectively cleaned a plate as described in Example 1.

EXAMPLE 3

A developer composition was formulated with:

| | Gm. |
|---|---|
| Dodecylbenzene sulfonic acid | 150 |
| Methyl Cellosolve | 38 |
| Oxalic acid | 7.8 |
| Water to 1000 cc. | |

The developer effectively cleaned a plate as described in Example 1.

EXAMPLE 4

A developer composition was formulated with:

| | Gm. |
|---|---|
| m-Benzene disulfonic acid | 150 |
| Cyclohexane | 38 |
| Sodium lauryl sulfate | 22.8 |
| Oxalic acid | 7.6 |
| Water to 1000 cc. | |

The developer effectively cleaned a plate as described in Example 1.

EXAMPLE 5

Developer compositions were formulated as described in Example 4 except that the benzene sulfonic acid thereof was replaced with:

(a) 2-hydroxy-4-methoxy-benzophenone-5-sulfate;
(b) p-nitrotoluene-ortho-sulfonic acid;
(c) ammonium xylene sulfate;
(d) toluene sulfonic acid monohydrate;
(e) 1-butane sulfonic acid;
(f) benzene sulfonic acid;
(g) dodecylbenzene sulfonic acid;
(h) 2,5-dichloro-benzenesulfonic acid;
(i) 2,4-dinitro-1-naphthol-7-sulfonic acid;
(j) sulfonated castor oil (Napco Oil 1408).

Each developer effectively cleaned a plate as described in Example 1.

It is to be understood that the foregoing examples are merely to illustrate the invention, and that modifications of the ingredients, proportions and conditions can be made by persons skilled in the art without departing from the scope of the invention as described hereinbefore and as defined in the appended claims.

We claim:

1. A developer composition for developing an exposed lithographic plate to remove therefrom a non-image area of a substantially water-insoluble and substantially solvent-soluble light-sensitive coating that is a reaction product of a diazo-aromatic compound and a hydroxyl-containing or sulfonic acid-containing compound which comprises an aqueous solution containing about 1% to about 25% by weight of a water-soluble organic aromatic sulfonic acid or a water-soluble salt thereof, up to about 20% by weight of a water-miscible solvent for said light-sensitive coating, up to about 5% by weight of a surfactant and up to about 5% by weight of phosphoric acid or oxalic acid.

2. A developer composition according to claim 1 wherein said diazo-aromatic compound is a para-diazo-diphenylamine.

3. A developer composition according to claim 1 wherein said sulfonic acid or said sulfonic acid salt is benzene sulfonic acid, toluene sulfonic acid, naphthalene sulfonic acid, 2,5-dimethyl-benzene sulfonic acid, benzene sodium sulfonate, naphthalene-2-sulfonic acid, 1-naphthol-2-(or 14-)-sulfonic acid, 2,4-dinitro-1-naphthol-7-sulfonic acid, 2-hydroxy-4-methoxy-benzo-phenone-5-sulfonic acid, m(p'-anilino-phenylazo)-benzene sodium sulfonate, alizarin sodium sulfonate, o-toluidine-m-sulfonic acid or ethane sulfonic acid.

4. A method for developing an exposed sensitized lithographic plate to remove therefrom a non-image area of a substantially water-insoluble and substantially solvent-soluble light-sensitive coating that is a reaction product of a diazo-aromatic compound and a hydroxyl-containing or sulfonic acid-containing compound which comprises treating the exposed surface of said plate with an aqueous solution containing about 1% to about 25% by weight of a water-soluble organic aromatic sulfonic acid or a water-soluble salt thereof, up to about 20% by weight of a water-miscible solvent for said light-sensitive coating, up to about 5% by weight of a surfactant and up to about 5% by weight of phosphoric acid or oxalic acid.

5. A method for developing a plate according to claim

4 wherein said sulfonic acid or said sulfonic acid salt is benzene sulfonic acid, toluene sulfonic acid, naphthalene sulfonic acid, 2,5-dimethyl-benzene sulfonic acid, benzene sodium sulfonate, naphthalene-2-sulfonic acid, 1-naphthol-2-(or -4-)-sulfonic acid, 2,4-dinitro-1-naphthol-7 - sulfonic acid, 2-hydroxy-4-methoxy-benzophenone-5-sulfonic acid, m-(p'-anilino-phenylazo)-benzene sodium sulfonate, alizarin sodium sulfonate, o-toluidine-m-sulfonic acid or ethane sulfonic acid.

6. A method for developing a plate according to claim 4 wherein said diazo-aromatic compound is a para-diazo-diphenylamine.

References Cited

UNITED STATES PATENTS

| | | | |
|---|---|---|---|
| 3,257,941 | 6/1966 | Wolfson et al. | 96—29 L X |
| 3,289,577 | 12/1966 | Uhlig | 96—33 X |
| 3,300,309 | 1/1967 | Chu | 96—33 X |
| 3,373,115 | 3/1968 | Steppan | 96—33 X |

DAVID KLEIN, Primary Examiner

U.S. Cl. X.R.

96—49